Nov. 21, 1961

C. O. GLASGOW ET AL 3,009,537

MEANS FOR TREATING OIL WELL EMULSIONS

Filed May 11, 1959

INVENTOR'S
JAY P. WALKER
CLARENCE O. GLASGOW
JUDSON D. LOWD
BY C. EDWARD de YOUNG

Arthur L Wade
ATTORNEY

Fig. 3.

Nov. 21, 1961 C. O. GLASGOW ET AL 3,009,537
MEANS FOR TREATING OIL WELL EMULSIONS
Filed May 11, 1959 6 Sheets-Sheet 4

Fig. 4.

INVENTOR'S
JAY P. WALKER
CLARENCE O. GLASGOW
JUDSON D. LOWD
BY C. EDWARD de YOUNG

Arthur L Wade
ATTORNEY

Nov. 21, 1961 C. O. GLASGOW ET AL 3,009,537
MEANS FOR TREATING OIL WELL EMULSIONS
Filed May 11, 1959 6 Sheets-Sheet 5

INVENTORS
JAY P. WALKER
CLARENCE O. GLASGOW
JUDSON D. LOWD
BY C. EDWARD de YOUNG

Arthur L Wade

ATTORNEY

Fig. 7.

United States Patent Office 3,009,537
Patented Nov. 21, 1961

3,009,537
MEANS FOR TREATING OIL WELL EMULSIONS
Clarence O. Glasgow, Jay P. Walker, Judson D. Lowd, and Charles Edward de Young, Tulsa, Okla., assignors to National Tank Company, Tulsa, Okla., a corporation of Nevada
Filed May 11, 1959, Ser. No. 812,496
9 Claims. (Cl. 183—2.7)

The present invention relates to emulsion treaters. The invention is particularly concerned with processing oil well production in the field in order to separate the production into oil, water and gas.

There are oil producing areas of the world where the rates of production are not limited by the political authority of the areas. The limitations on production in these areas are the producing capabilities of the wells, market demand, and the capacity of the facilities for storing and transporting the crude production to market. The unlimited production in these areas often demand that the individual equipment units separating and treating the production have capacities ranging between 3,000 gross barrels a day to 10,000 gross barrels a day. One of the basic problems of treating production at this rate is found in providing sufficient heat to give the required separation of the production into oil, water and gas.

Another problem in these oil producing areas of unlimited production is brought about by their remoteness from adequate labor and facilities for installing oil handling equipment, such as treaters. The labor available is often inexperienced and the erection equipment inadequate to set a treating vessel of the vertical type. An elongated vessel, extended horizontally, is very desirable in these situations. Therefore, the problem of handling large volumes of production may have the added limitation of treating the production in a vessel limited to horizontal extensions.

A basic problem in flowing oil well production through a horizontal vessel develops from the fact that the production is a mixture of fluids which have a natural tendency to separate from each other in vertical directions. Moving this mixture of vertically separating fluids horizontally creates force components on the elements of the mixture which interferes with their natural tendency to vertically separate.

A further problem in moving fluids through a horizontally extended treating vessel is found in developing enough force to move the fluids horizontally from the entrance to the exit of the vessel. The natural force of fluid head is quite limited in a horizontal vessel. In two compartments of the same vessel the difference in liquid levels within a horizontal vessel is much smaller than within a vertically extended vessel. Further, as the incoming liquid level rises in the horizontal vessel, the volume of liquid available for developing the head force is reduced by the upper curvature of the cylindrical shell. Therefore, when the head force is most needed, it reduces in inverse ratio to the need for it.

The horizontally extended treater vessels presently available have not fully exploited the natural forces available within streams of oil well production. For a vessel of given diameter, the horizontal extension gives a greater capacity than its vertical extension. Further, with gases separated and evolved in an initial stage of heating, their natural pressure force is used to propel the liquids freed of the gases through conduits which are a finite amount smaller than would be required if the gases were not freed. The freed gas itself can be used for fuel or other purposes. The present invention is embodied in structure which functions to exploit the natural forces of the vertically moving components of the well stream and utilize the force of the gaseous components of the well stream to move the production vertically through process stages within a horizontally extended vessel.

The treating process of oil well production in the quantities contemplated does not, inherently, offer problems different from those found in areas where more limited production is normal. Where heat is used to break the production into its component parts, a settling period is subsequently provided to allow the oil and water to coalesce and separate. However, with the production moved vertically over a heat source of the size required to bring the larger rates up to treating temperature, there are specific problems which must be solved to produce a liquid mixture into the settling section of the treater which will quickly and effectively separate into oil and water. A major problem centers about the removal of gas from the liquid. With the gas removed from the liquids produced at the high rates contemplated, moving as rapidly as made necessary by the high rates of production, the quiescent condition which results promotes the settling of water from the oil.

Production of high viscosity foaming oils presents a particular problem in selecting which of the vertical movements of the production over the relatively large heat source mounted in the heating section will most desirably prepare the liquid mixture flowing into the settling section. Often, the up-flow versus down-flow decision is desirably arrived at by empirical methods. After field test, it may be obvious that the wrong selection has been made. Conditions in the field are often difficult to predict. Data from the remote areas of unlimited production may be unavailable, or in error. Therefore, a complete change, as between the up-flow pattern and down-flow pattern in the heating section of a treater, may be highly desirable. Providing this selection, and change of the selection, in the field offers a problem of considerable magnitude and importance.

The problem of initial selection, and possible later change in the selection, between up-flow pattern and down-flow pattern can be based on certain generalizations. The gas-oil ratio is one factor. The gravity and viscosity of the production are other factors. Also the very "tightness" of the emulsion may change the situation. However, certain formulations may be made with which to arrive at a solution to the selection problem.

The down-flow pattern over the heat source is first considered. Obviously, release of the well stream above the heat source provides good initial gas separation. Free gas in the well stream simply flows out the gas line connected to the upper part of the heating section, and readily released gas has the best opportunity for the least travel distance out of the liquids to reach the common gas outlet. The water in the well stream sinks quickly to the bottom of the heating section, passing over the heat source only once, and is discharged from the heating section with a minimum of time opportunity to absorb valuable heat. As the water does not absorb appreciable heat, the saved heat enables the same size heat source to heat much larger quantities of emulsion per hour.

The lighter emulsion and oil is forced down over the heat source because of the gas pressure maintained in that chamber and remains in contact with the heat source a maximum time. Although the heat transfer rate to emulsion and oil, from the heat source, is lower than the heat transfer rate to water, the agitation of the liquids due to turbulence of evolving the gaseous components, induced by the heat transfer from the heat source itself, increases this heat transfer rate to emulsion and oil over the extended period of oil-heat source contact. The result is a very satisfactory rise in temperature of the emulsion of the well stream.

The up-flow pattern over the heat source is to be contrasted with down-flow pattern on every point. The gas of the production, free and evolved, must travel the full length of the flow path, through the liquids. The water is flowed upwardly with the production and then, whether free or developed through emulsion reduction by the heat, travels downwardly, increasing the contact time with the heat source and absorbing valuable heat. The upwardly flowing oil and emulsion does travel through the large body of heated water collected about the heat source. Upflow of this emulsion and oil does reduce the viscosity and results in a good initial liquid-liquid separation between oil and water developed by the heat. The gas which is also evolved by the heat is released to travel upwardly with the liquids. Thus the gas developed by the heat takes the natural upward path to separate from the liquids in going to its exit.

Bringing the foregoing inherent characteristics of an up-flow pattern and down-flow pattern before an operator, the gas-oil ratio of the well stream as it enters the treater becomes an important initial parameter of his selection problem. If the included gas-oil ratio is high, and the mechanically entrained gas in the liquids will also counterflow in the liquids readily, a down-flow pattern appears desirable. The resulting counterflow relation between the gas and liquids will depend upon both the gravity and viscosity characteristics of the liquids.

Should both the gas-oil ratio be low, and the mechanically entrained gas not readily counterflow, an up-flow pattern would appear desirable. The reduction in viscosity, by washing the emulsion and oil through the large body of heated water, would appear effective to break out the gas in the heating section before passing the liquids to the coalescing section. Further, the advantage of good, initial, water-oil separation is gained by the up-flow pattern. But most important, some mixtures of oil and emulsions tend to deposit carbonates on the heat source and cause early failures when the heat source is surrounded continuously by emulsion and oil as it would be in the down-flow pattern. The up-flow pattern provides the tendency to collect a bath of water having a level which may be controlled, relative to the height of the heat source, as may be desired.

A primary object of the invention is to provide sufficient heating of a large volume of oil well production which is moved vertically in sections of a horizontal treating vessel to evolve substantially all the gaseous fluids of the production and coalesce the liquids of the production.

Another object is to provide for optionally selecting the vertical direction of flow of the production over the main source of heat in the horizontal treating vessel to give the residence time required between the heat source and the production which will prepare the production for coalescence.

Another object is to move the production in its selected vertical direction over the main heat source and through coalescence with the pressure of the separated and evolved gaseous components of the production.

Another object is to supply heat to the coalescing section of a horizontal treating vessel at the time of initial start-up of the treating process.

Another object is to distribute emulsion effectively through a heated zone of a horizontal treating vessel in preparing the emulsion for flowing uniformly through the coalescence section of the vessel.

The present invention contemplates a horizontal vessel in which a large volume of oil well production is effectively heated by large heating surfaces, relative to the vessel size, while flowing vertically in a first section, to evolve substantially all the gaseous fluids of the production and have its oil and water effectively coalesced while flowing vertically upwards in a second section.

The invention further contemplates means to direct the flow of the large volume of production selectively, either up or down, over the source of heat with residence time between the heat source and production sufficient to heat the production high enough to evolve substantially all the gaseous fluids and effectively prepare the production for coalescence.

The invention further contemplates the heating occurring in one vessel compartment and the coalescence occurring in a second vessel compartment, the liquids of the production being moved from the first to the second compartment, and removed from the second compartment, by the pressure of gas separated and evolved from the production.

The invention further contemplates a second source of heat mounted below the coalescence section which will quickly condition any oil or emulsion congealed in the coalescence section by bringing the coalescence section up to operative temperature when the operation of the process is started.

Another feature of the present invention is to provide a series of staggered baffle structures under the heat source beneath the second, coalescing, section which divide the emulsion into a multitude of ascending streams through a body of water heated by the source to effectively maintain the temperature of the emulsion within a desired range and distribute is uniformly beneath the coalescing section to promote uniform flow up through the second section.

Other objects, advantages and features of this invention will become more apparent to one skilled in the art upon consideration of the written specifications, appended claims, and the attached drawings wherein:

*The general structure*

Figure 1:
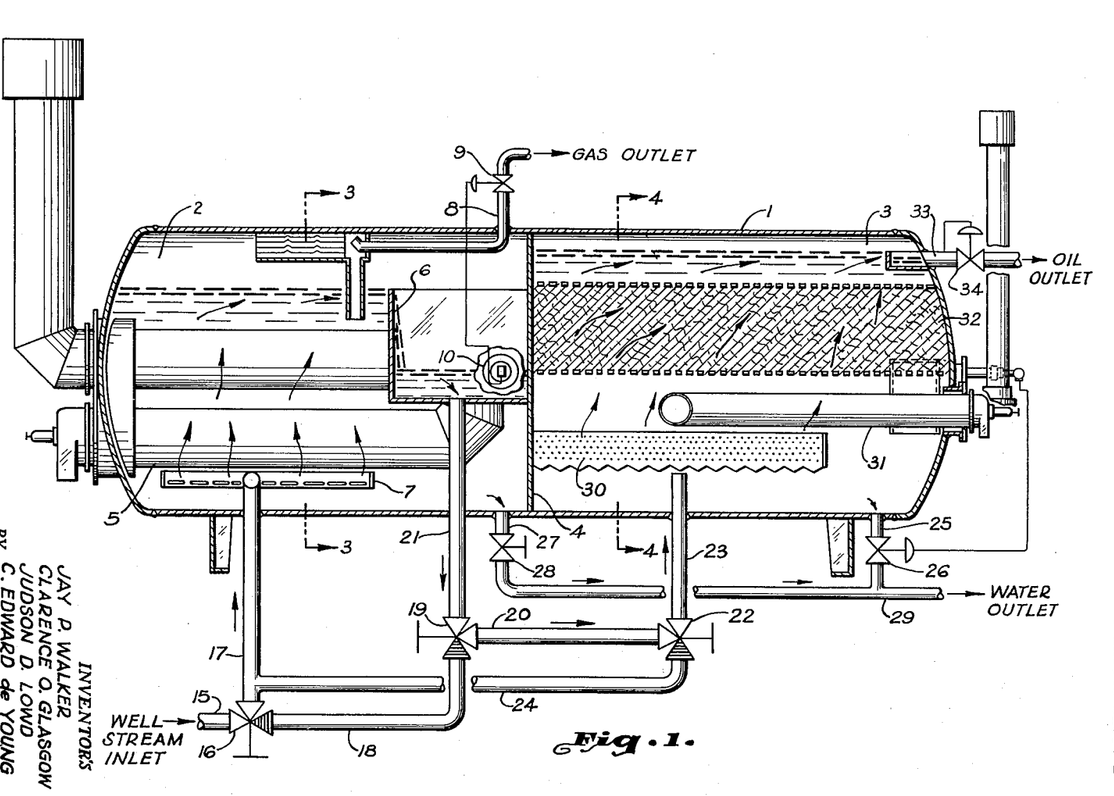
FIG. 1 is a diagrammatic, sectioned, side elevation of a treater embodying features of the present invention.
Figure 2:
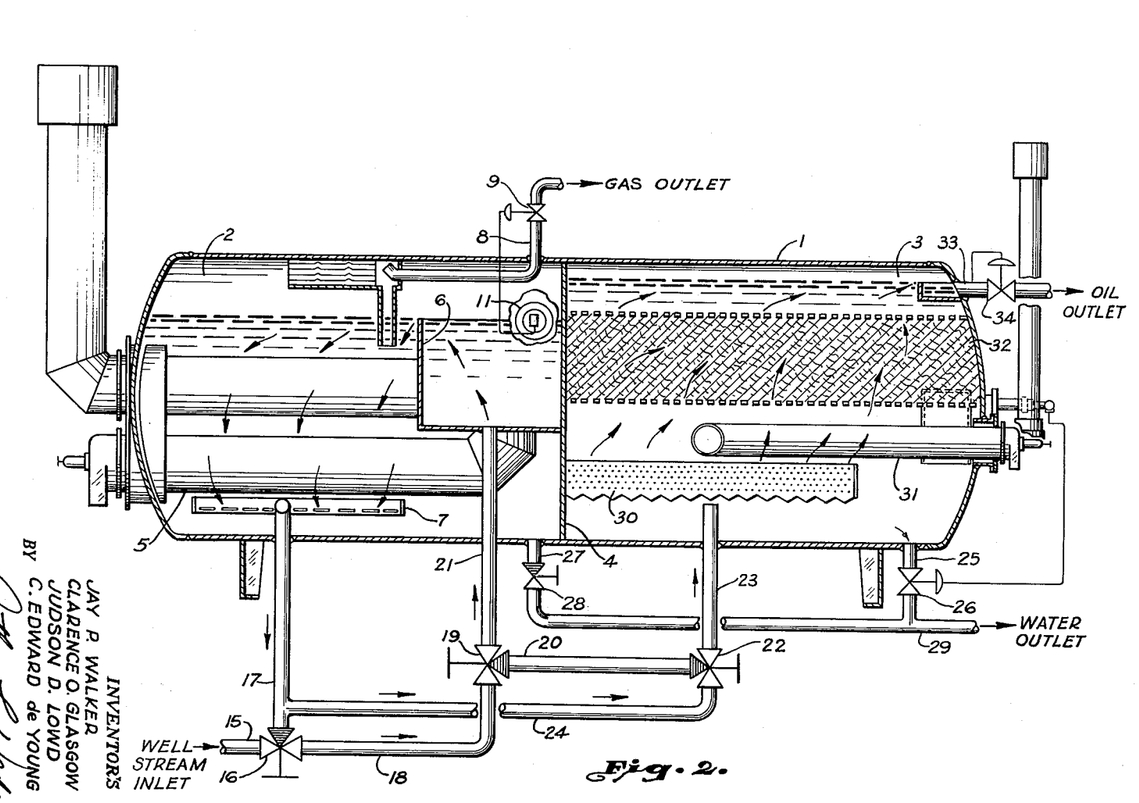
FIG. 2 is the treater of FIG. 1, but illustrating the alternate direction of flow of a well stream through the heating section.

FIGS. 1 and 2 represent the same horizontal oil well production treater. However, the conduit system supplying the well stream to be treated, and the conduit system for removing water developed from the well stream, is illustrated as directing the well stream into the treater, and the water away from the treater, under two different conditions of operation. In FIG. 1 the well stream is directed to flow upwardly over the main heat source of the treater. In FIG. 2 the well stream is directed to flow downwardly over the heat source. In FIG. 1 the possibility of water removal from both compartments of the treater is illustrated. In FIG. 2 the water is illustrated as removed from only the settling, or coalescing, section.

Referring more specifically to FIGS. 1 and 2, the horizontal treater is illustrated as comprised of a shell 1 with two compartments. First compartment 2 and second compartment 3 are formed within shell 1 by a vertical, transverse, partition 4. Obviously, first and second compartments 2 and 3 could be formed in separate vessels rather than within the single shell 1. However, such an arrangement would necessitate extra closure ends for the two shells. No particular advantage is recognized, at this time, by having two separate vessels.

An actual reduction to practice of the invention utilizes a shell in the order of ten feet in diameter. The expected rates of fluid flow of well stream production through the ten foot treater is in the order of seven to nine thousand barrels per day. Actually, the range of capacity of this treater is between three thousand barrels and ten thousand barrels a day. A basic problem of treating production within this range of rates is found in providing sufficient quantities of heat to break the production into its three components of gas, oil and water.

The large capacity heat source

The tremendous quantity of heat required to raise the temperature of the production to the coalescing temperature is supplied by two large firetubes 5. In FIGS. 1 and 2, only one of these firetubes can be viewed. Both firetubes can be viewed in the cross section of FIG. 3. Each of these firetubes, in the actual reduction to practice referred to above, was sized to produce two million B.t.u./hour for heating the large volume of fluids passing through compartment 2. The firetubes then, except for the length required to obtain the tremendously large heat capacity, are otherwise of conventional design, being fired with gas or oil and controlled from standard thermometer elements inserted into the heated liquids. The details of the control system, and fuel supply, for these tubes is not shown.

Vertical flow selection in the heating compartment

Dual firetubes 5, representing the heat source of large capacity mounted in first compartment 2, will hereinafter be referred to simply as the heat source over which the well stream production is vertically flowed. One of the basic problems in vertically flowing the well stream over the heat source is solved by selecting which of the alternate vertical directions will most efficiently evolve substantially all of the gaseous fluids to be evolved from the production in the treating process carried out within this heating section in first compartment 2. The present invention provides means whereby this vertical direction may be readily selected, and changed, in accordance with predetermined calculations, or empirical field tests. The ultimate objective is to pass the production over the heater so the production will be properly prepared to pass vertically up through the coalescing section in compartment 3 to complete the treating process. The conduit manifold, and its valving, illustrated below shell 1 represents a means for establishing the up-flow or down-flow pattern desired in first compartment 2.

Figure 3:
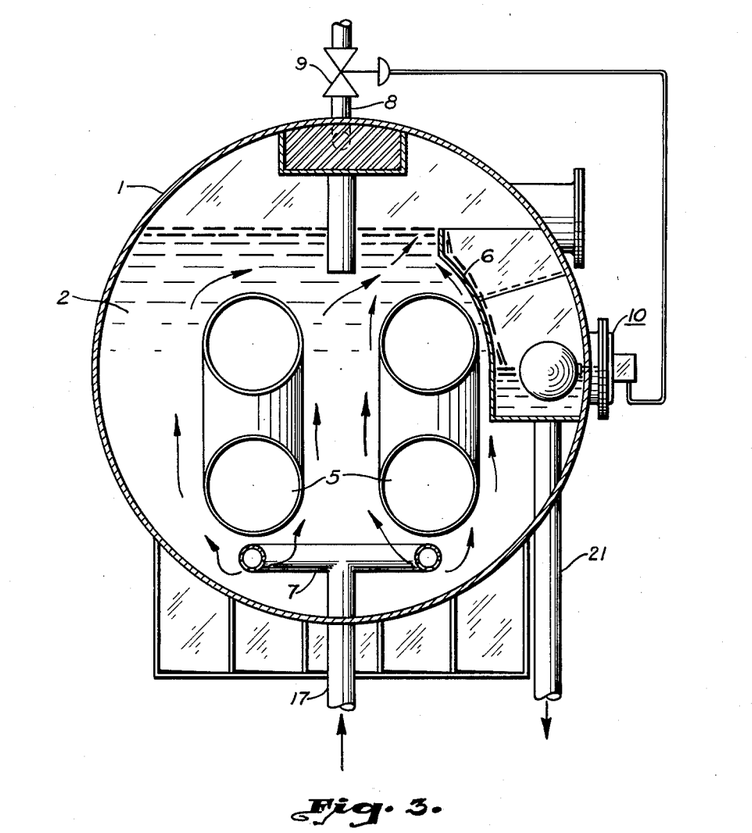
FIG. 3 is a section of FIG. 1 taken along lines 3—3.
Figure 5:
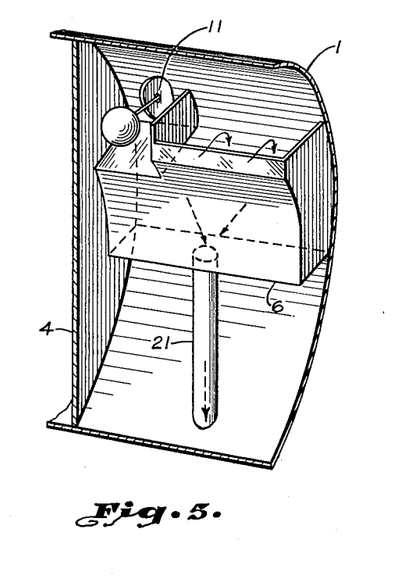
FIG. 5 is a perspective view of a structure within the heating section of the treater shell of FIGS. 1 and 2.

Before considering the piping manifold for the incoming well stream and outgoing water developed, the specific structure within first compartment 2 with which the manifold piping is connected will be considered. A weir box 6 is illustrated to some degree by FIGS. 1 and 2. FIGS. 3 and 5 provide more complete illustration of this structure. For the present, box 6 is simply referred to as the receptacle into which the liquids of the well stream are collected in the up-flow pattern over the heater 5 and from which the production in liquids flow in the down-flow pattern over heater 5. The conduit manifold below shell 1 connects to the bottom of this box 6.

A spreader structure 7 is mounted below heat source 5. Spreader 7 is connected to the conduit manifold, as is box 6, to form an introduction point for the well stream into compartment 2, or a removal point for the liquids of the well stream from compartment 2.

The gas which is separated and evolved in compartment 2 is evacuated through a conduit 8 under the control of a valve 9. Gas valve 9 is controlled by one of two float positions responding to liquid levels in compartment 2. A liquid level responsive mechanism 10 is indicated, developing a control fluid pressure for valve 9 in FIG. 1. FIG. 3 illustrates the float of level control 10 near the bottom of box 6. When the flow of well fluids through compartment 2 is in an up-flow pattern over heat source 5, level control 10 maintains the level of the liquids near the bottom of box 6 as illustrated in FIGS. 1 and 3.

Level control 11 is illustrated in FIGS. 2 and 5 as controlling the level of liquids in compartment 2 slightly above the weir lip of box 6. It is now apparent that level control 10, or level control 11, is arranged to control valve 9 after the basic selection of an up-flow pattern or down-flow pattern of the production over heat source 5 has been made.

Conduit system

Attention is now specifically directed to the conduit system below the treater with which the well stream is alternately directed into an up-flow pattern or a down-flow pattern relative to heat source 5. The well stream inlet conduit 15 is connected to three-way valve 16. Depending upon which of the alternate settings of valve 16 is desired, the well stream is flowed into conduit 17 or conduit 18. In FIG. 1, valve 16 connects 15 and 17 to flow the production to spreader 7 and upwardly over heat source 5. Conduit 18 leads to a second three-way valve 19.

Valve 19 is positioned to alternately connect conduit 18 to box 6 or conduit 20. In FIG. 1 valve 19 is illustrated as positioned to connect conduit 20 and conduit 21 so the liquids in box 6 may be removed to compartment 3. In FIG. 2, valve 19 is positioned to connect conduit 18 and conduit 21 so the well stream from inlet conduit 15 will flow to box 6 and downwardly over heat source 5.

Considering more specifically the evacuation of liquids from the heating section to the coalescing section in second compartment 3, valves 19 and 22 are positioned to either connect conduit 23 to conduit 20 or conduit 24. Thus, in FIG. 1, the liquids are flowed from box 6 to second compartment 3 through conduits 21, 20 and 23 or they are flowed from the spreader of compartment 2 to compartment 3 by conduits 17, 24 and 23.

The three three-way valves, 16, 19 and 22 are alternately positioned to make the selection of an up-flow pattern or a down-flow pattern of the well stream over heat source 5 and to the coalescing section of compartment 3. The three-way valves are illustrated as manually manipulated to attain the pattern desired. It is conceivable that the valves could be automatically operated. In general, the conditions of selection are changed so infrequently that valves 16, 19 and 22 can be manually manipulated, or even replaced by permanent unions, once the desired flow pattern has been established for a particular oil well production.

Water is continuously developed in both compartments of the shell 1. The water agglomerated and developed in compartment 3 is continuously withdrawn to maintain an interface with the clean oil product. Conduit 25 is connected to the bottom of compartment 3 for withdrawal of this water. Valve 26 is in conduit 25 to control the flow of the water through conduit 25. A control mechanism responsive to the oil-water interface modulates valve 26 in regulation of the water through conduit 25, from compartment 3.

Water which is free in the well stream, and water which is developed in the up-flow pattern in compartment 2, may be removed from the lower part of compartment 2 to avoid being heated by source 5. Conduit 27 is provided for removal of this water, if removal, proves feasible. Valve 28 is placed in conduit 27 to control the removal of water through the conduit. It is not normally contemplated that an interface will be detectable in compartment 2 during the up-flow pattern. Therefore, valve 28 can be manually adjusted and set to draw off water at the rate it is developed as empirically determined.

Whether the water removed from compartment 2 and compartment 3 is withdrawn automatically or manually, it can be combined for disposal. Conduits 25 and 27 are illustrated as joined in conduit 29 for transport of the water to a common point of disposal. In summation, FIG. 1 illustrates the flow pattern of water which might be possible in the up-flow pattern; water being removed from both compartments, FIG. 2 illustrates the flow pattern of water which is contemplated in the down-flow pattern; water being removed from only the second compartment 3 as all the production liquids are brought to compartment 3 with conduits 17, 24 and 23.

Gas pressure

The gaseous component of the well stream heated in first compartment 2 is ultimately removed through conduit 8. This gaseous component is made up from three sources, the first of which is that gas which is free of the liquids of the production when it comes into first compartment 2. The second source is that gas mechanically entrained in the liquids, and the third source is that evolved from the liquids by the heat source 5.

If gases from the second and third sources leave the liquid surface still contained within a film of oil, the result of this association of oil and gas is foam. The large liquid surface provided in the upper part of compartment 2, along with the mechanical scrubber element, will depreciate this foam. The liquids will be returned to the main body, and the gases will pass out conduit 8, under the control of modulated valve 9.

In coalescing compartment 3, gas will continue to separate and evolve to some extent above the clean oil. This gas may be removed along with the clean oil product, through conduit 33, and separated downstream. A back pressure valve 34 in conduit 33 is illustrated to control the pressure in compartment 3. Modulation of valve 9 by the controls 10 or 11, responding to either of two liquid levels, maintains the differential of gas pressure between compartment 2 and compartment 3. This differential is adjusted from these liquid levels to maintain the force required to move the liquids from compartment 2 and the clean oil up through compartment 3 and out to a point of storage or use.

General operation

The over-all flow pattern through shell 1 has now been described. A horizontal vessel has been disclosed in which a large volume of oil well production is effectively heated by a tremendous amount of heat while the production is flowing vertically in a first section of the vessel to evolve substantially all of the gaseous fluids of the production. Heated production is then flowed to a second section of the vessel where the oil and water are effectively coalesced while flowing vertically. The concept of horizontal flow of the liquids being processed in the compartments of the horizontal vessel has been eliminated.

Further, a conduit and valve system have been disclosed with which flow of the large volume of production can be made selectively up or down over the primary source of heat. Selection of the flow pattern with this means provides the residence time which is required between the heat source and production to heat the production high enough to effectively prepare the production for coalescence.

A secondary heat source, in the coalescing section of the vessel, has been disclosed with which the optimum temperature of production for efficient coalescence is regained, or maintained, at the critical point of entry of the liquids into the coalesced section. This secondary heat source has the further convenient function of facilitating the start-up of the process by "melting" the cold production which had been left in the coalescing section.

The development of the power required to move the liquids vertically in the two vessel compartments has been illustrated as embodied in the control of the pressure of the gas released from the first compartment by mechanisms responsive to liquid level in the first compartment. In the up-flow pattern, FIG. 1 illustrates how the oil and emulsion are held at substantially weir-level of box 6. The liquids fall into box 6 and establish a level in the box which is detected and maintained by mechanism developing a control signal for valve 9.

FIG. 2 specifically illustrates the down-flow pattern of production over heat source 5 in which the level of liquids in compartment 2 is detected and maintained a finite distance above the weir-level of box 6. Level responsive mechanism 11, under the selection of down-flow, is placed in control of valve 9 to develop the gas pressure necessary on the surface of compartment 2 liquids to force them from the compartment 2 and the oil vertically up through compartment 3 to outlet conduit 33.

It is anticipated, in FIG. 1, under the up-flow pattern that there will be a tendency to establish a body of water, about and above heat source 5. It is conceivable that the interface between the lighter oil and emulsion and the heavier water in compartment 2 could be sensed to control the discharge of water from compartment 2 through conduit 27. However, no such interface control is illustrated in FIG. 1. It is assumed that control of discharge of water through conduit 27 can be regulated in one of many desired manners to maintain the level of water in compartment 2 at the height most effective to bring the processed oil and emulsion to the desired temperature for coalescence.

Figure 6:
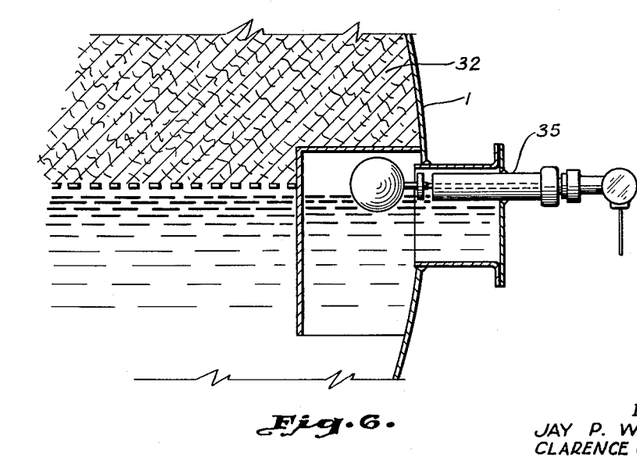
FIG. 6 is a sectioned elevation of a portion of the coalescing section of the shell of FIGS. 1 and 2 showing the float that controls the oil-water interface in the section.

In FIG. 2, the down-flow pattern of the liquids over heat source 5 includes the removal of all liquids through conduit 17. Therefore, valve 28 will be closed, as shown in FIG. 2, and water removed only from compartment 3. A definite interface between the oil and emulsion in compartment 3, and its water, is desirably established. A mechanism for detecting and controlling the spatial relationship of this interface to heater 31 and coalescing section 32 is indicated at 35. This level control mechanism is not completely disclosed in FIG. 1, 2 or even 4. Therefore, FIG. 6 is established to specifically disclose the details of the float and mechanism responsive to the float which develops a fluid pressure for a valve in conduit 25. The fluid pressure control signal developed by control mechanism 35 is applied to valve 26 to regulate the discharge of water and, therefore, the interface height.

Emulsion distribution in compartment 3

Figure 4:
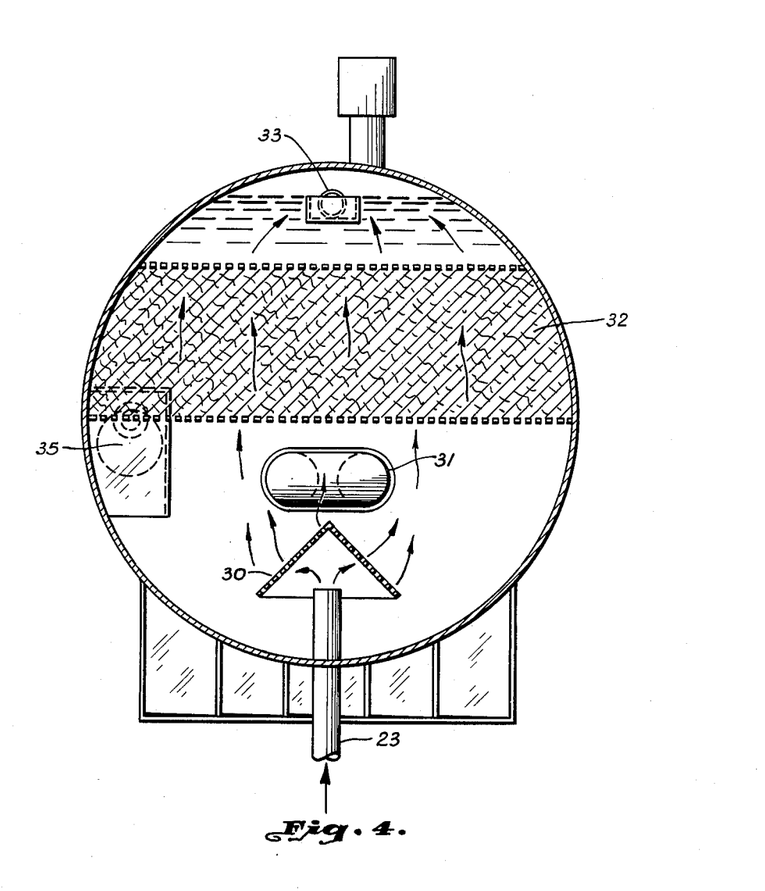
FIG. 4 is a section of FIG. 1 taken along line 4—4.

With a body of water maintained in a lower portion of compartment 3, attention is directed to the means disclosed for the efficient distribution of the oil and emulsion of conduit 23 in this body of water. FIGS. 1, 2 and 4 illustrate a relatively simple spreader 30. However, there are other baffle arrangements which might be employed to more efficiently distribute low-gravity high-viscosity emulsion through this body of heated water in compartment 3 for at least the purpose of improving the heat transfer and maintaining the emulsion at the proper treating temperature. Further, a correctly designed baffle structure will spread the oil and emulsion uniformly over the lower surface of coalescing section 32 to militate against channeling through the section, and the section will thereby operate more efficiently.

Figure 7:
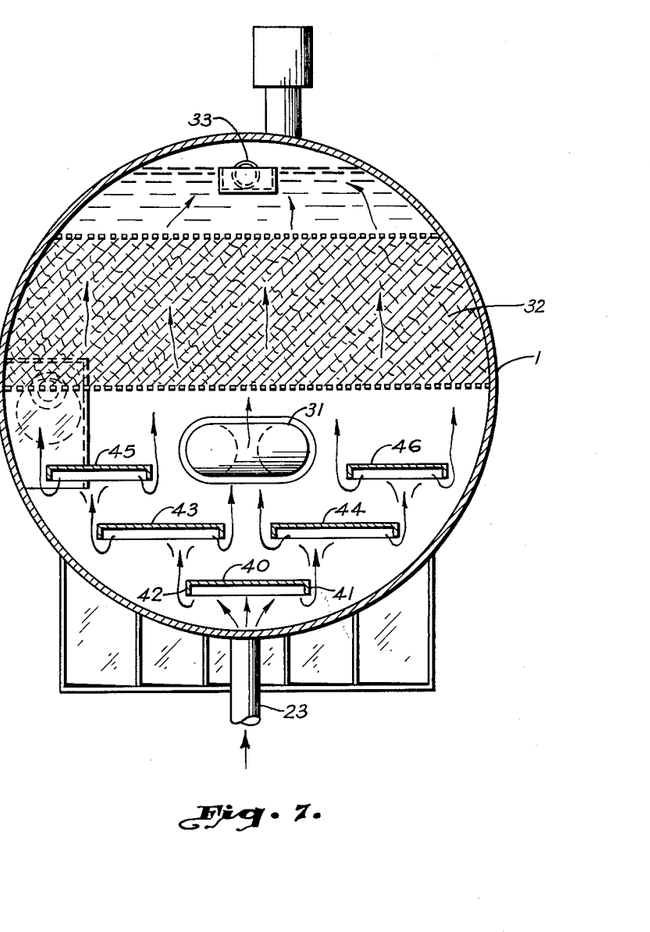
FIG. 7 is a section of a treater similar to that of FIGS. 1 and 2 showing an alternate form of structure for their coalescing sections.

FIG. 7 has been established to illustrate a form of baffling structure which will carry out the desired distributing function on the oil and emulsion in compartment 3. A series of horizontal plates with downwardly turned lips are illustrated as established at a multiplicity of levels.

A plate 40 is illustrated as initially receiving the liquids of conduit 23 on its underside. Plate 40 has lips 41 and 42 which are downwardly turned to provide for the oil and emulsion that spreads out in a layer beneath plate 40. The oil and emulsion will skim from beneath plate 40, over lips 41 and 42, in streams of upwardly ascending oil and emulsion. These upwardly ascending streams of oil and emulsion will then impinge upon, and be retained by, plates 43 and 44, similar to plate 40. Plates 43 and 44 will each divide the oil and emulsion streams further into upwardly ascending streams, some of which will impinge and collect upon the underside of plates 45 and 46. Finally, upwardly ascending streams of oil and emulsion from plates 43, 44, 45 and 46 will reach coalescing section 32 in uniform distribution over the undersurface of the section. Coalescence will then take place evenly through section 32 to develop the body of clean oil going out conduit 33.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An oil well production treater, including,
   an elongated and horizontally extended shell,
   a first compartment in the shell,
   a second compartment in the shell,
   a heat source mounted in the first compartment,
   an inlet into the first compartment for oil well production to be treated,
   means for directing the production from the inlet into the first compartment selectively at one of two points to flow the production downwardly over the heat source from one point if selected and upwardly over the heat source from the second point if selected,
   means for conducting the oil and the emulsion of the production from the first compartment to the second compartment,
   means for development of a pressure differential between the two compartments with one of two level detectors controlling release of evolved and separated gas from the first compartment,
   means for directing the emulsion and oil conducted to the second compartment upwardly in the second compartment in the shell,
   a coalescing section in the second compartment receiving the upwardly directed emulsion and oil of the production,
   an oil outlet from the second compartment above the coalescing section, and a water outlet from the second compartment below the coalescing section.

2. An oil well production treater, including,
   an elongated and horizontally extended shell,
   a first compartment in the shell,
   a heat source of large capacity mounted in the first compartment,
   an inlet into the first compartment for oil well production to be treated,
   means for directing the production from the inlet into the first compartment selectively at one of two point to flow the production downwardly over the heat source from one point if selected and upwardly over the heat source from the second point if selected,
   means for removing the oil and emulsion of the production from the first compartment,
   a second compartment in the shell,
   means for directing the emulsion and oil from the first compartment upwardly in the second compartment in the shell,
   a coalescing section in the second compartment receiving the upwardly directed emulsion and oil of the production,
   a second source of heat in the second compartment and located beneath the coalescing section with which heat loss from the emulsion and oil is compensated as these liquids are removed from the first through the second compartment,
   an oil outlet from the second compartment above the coalescing section,
   and a water outlet from the second compartment below the coalescing section.

3. An oil well production treater, including,
   an elongated and horizontally extended shell,
   a first compartment in the shell,
   a heat source of large capacity mounted in the first compartment,
   an inlet into the first compartment for oil well production to be treated,
   means for directing the production into the first compartment selectively at two points including a weir box receptacle and conduit from its bottom out of which the production flows downwardly over the heat source from the weir as the one point and into which the production flows from passing upwardly over the heat source from the second point located beneath the heat source,
   means for removing the oil and emulsion of the production from the first compartment,
   a second compartment in the shell,
   means for directing the emulsion and oil from the first compartment upwardly in the second compartment in the shell,
   a coalescing section in the second compartment receiving the upwardly directed emulsion and oil of the production,
   an oil outlet from the second compartment above the coalescing section,
   and a water outlet from the second compartment below the coalescing section.

4. An oil well production treater, including,
   an elongated and horizontally extended shell,
   a first compartment in the shell,
   a heat source of large capacity mounted in the first compartment,
   an inlet into the first compartment for oil well production to be treated,
   means for directing the production into the first compartment selectively at two points including a weir box receptacle and a conduit system which can be selectively arranged to connect the production inlet to the first compartment to provide the choice between flowing the production vertically upwards and flowing the production vertically downwards over the heat source of large capacity,
   means for removing the oil and emulsion of the production from the first compartment,
   a second compartment in the shell,
   means for directing the emulsion and oil from the first compartment upwardly in the second compartment in the shell,
   a coalescing section in the second compartment receiving the upwardly directed emulsion and oil of the production,
   an oil outlet from the second compartment above the coalescing section,
   and a water outlet from the second compartment below the coalescing section.

5. An oil well production treater, including,
   an elongated and horizontally extended shell,
   a first compartment in the shell,
   a heat source of large capacity mounted in the first compartment, an inlet into the first compartment for oil well production to be treated,
   means for directing the production from the inlet into the first compartment selectively at one of two points to flow the production downwardly over the heat source from one point if selected and upwardly over the heat source from the second point if selected,
   means for removing the oil and emulsion of the production from the first compartment,
   a water outlet provided at a point near the bottom of the first compartment for removing water developed by the large capacity heat source when the production is flowed vertically upwards over the heat source,
a second compartment in the shell,
means for directing the emulsion and oil from the first compartment upwardly in the second compartment in the shell,
a coalescing section in the second compartment receiving the upwardly directed emulsion and oil of the production,
an oil outlet from the second compartment above the coalescing section, and water outlet from the second compartment below the coalescing section.

6. An oil well production treater, including, an elongated and horizontally extended shell,
a first compartment in the shell,
a heat source of large capacity mounted in the first compartment,
an inlet into the first compartment for oil well production to be treated,
means for directing the production from the inlet into the first compartment selectively at one of two points to flow the production downwardly over the heat source from one point if selected and upwardly over the heat source from the second point if selected,
means for removing the oil and emulsion of the production from the first compartment,
a second compartment in the shell,
means for directing the emulsion and oil from the first compartment upwardly in the second compartment in the shell,
a coalescing section in the second compartment receiving the upwardly directed emulsion and oil of the production,
a baffle system in the second compartment to receive the emulsion and oil directed vertically upwards through the second compartment from the first compartment and divide and subdivide the emulsion and oil into a multiplicity of upwardly ascending streams laterally distributed over the area beneath the coalescing section,
an oil outlet from the second compartment above the coalescing section,
and a water outlet from the second compartment below the coalescing section.

7. An oil well production treater, including, an elongated and horizontally extended shell,
a first compartment within the shell,
a heat source of large capacity mounted in the first compartment,
an inlet conduit for bringing oil well production to be treated to the first compartment,
a second compartment within the shell,
a manifold of conduits between the inlet conduit and the two compartments valved to direct the production from the inlet conduit into the first compartment selectively at one of two points to flow the production downwardly over the heat source from one of the points selected and upwardly over the heat source from the other of the points selected and removing the oil and emulsion of the production from the first compartment to the second compartment,
means for development of a pressure differential between the two compartments with one of two level detectors controlling release of evolved and separated gas from the first compartment,
means for directing the emulsion and oil from the first compartment upwardly in the second compartment in the shell,
a coalescing section in the second compartment receiving the upwardly directed emulsion and oil of the production,
an oil outlet from the second compartment above the coalescing section,
and a water outlet from the second compartment below the coalescing section.

8. An oil well production treater, including, an elongated and horizontally extended shell,
a first compartment within the shell,
a heat source of large capacity mounted in the first compartment, an inlet conduit for bringing oil well production to be treated to the first compartment,
a second compartment within the shell,
a manifold of conduits between the inlet conduit and the two compartments including a first valve to alternately direct the production from the inlet conduit into the first compartment through an inlet spreader in the bottom of the compartment beneath the heat source at one point and a weir box receptacle within the compartment out of which the production flows downwardly over the heat source from the weir at the other point,
means for directing the emulsion and oil from the first compartment upwardly in the second compartment in the shell,
a coalescing section in the second compartment receiving the upwardly directed emulsion and oil of the production,
an oil outlet from the second compartment above the coalescing section,
and a water outlet from the second compartment below the coalescing section.

9. An oil well production treater, including, an elongated and horizontally extended shell,
a first compartment within the shell,
a heat source of large capacity mounted in the first compartment,
an inlet conduit for bringing oil well production to be treated to the first compartment,
a second compartment within the shell,
a manifold of conduits between the inlet conduit and the two compartments including a first valve to alternately direct the production from the inlet conduit into the first compartment through an inlet spreader in the bottom of the compartment beneath the heat source at one point and a weir box receptacle within the compartment out of which the production flows downwardly over the heat source from the weir at the other point and second and third valves to alternately direct the oil and emulsion of the production from the two points of the first compartment to flow upwardly in the second compartment,
means for directing the emulsion and oil from the first compartment upwardly in the second compartment in the shell,
a coalescing section in the second compartment receiving the upwardly directed emulsion and oil of the production,
an oil outlet from the second compartment above the coalescing section,
and a water outlet from the second compartment below the coalescing section.

References Cited in the file of this patent

UNITED STATES PATENTS 2,864,502    May _________________ Dec. 16, 1958